US010596583B2

(12) United States Patent
Levasseur et al.

(10) Patent No.: US 10,596,583 B2
(45) Date of Patent: Mar. 24, 2020

(54) SYSTEM AND METHOD FOR REGULATING THE VISCOSITY OF A FLUID PRIOR TO ATOMIZATION

(71) Applicant: GENERAL ELECTRIC TECHNOLOGY GMBH, Baden (CH)

(72) Inventors: Armand Levasseur, Windsor Locks, CT (US); Carl Edberg, Stafford, CT (US); Olaf Stallmann, Essenheim (DE); Mourad Younes, Abqaiq (SA); Aqil Jamal, Richmond, TX (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 258 days.

(21) Appl. No.: 15/151,780

(22) Filed: May 11, 2016

(65) Prior Publication Data
US 2017/0326569 A1    Nov. 16, 2017

(51) Int. Cl.
| F27D 17/00 | (2006.01) |
| B05B 12/10 | (2006.01) |
| F23K 5/20 | (2006.01) |
| G05D 24/02 | (2006.01) |
| B05B 9/00 | (2006.01) |

(Continued)

(52) U.S. Cl.
CPC ............. B05B 12/10 (2013.01); B05B 9/002 (2013.01); F23K 5/20 (2013.01); F27D 17/004 (2013.01); G05D 24/02 (2013.01); F02D 33/003 (2013.01); F02M 31/16 (2013.01); F23K 2301/204 (2013.01); F23K 2301/206 (2013.01)

(58) Field of Classification Search
CPC ......... B05B 12/10; B05B 9/002; F27D 17/00; F27D 17/004; F23K 5/20

USPC .......................................... 122/17.1, 17.2, 23
See application file for complete search history.

(56) References Cited

U.S. PATENT DOCUMENTS 2,987,605 A    6/1961  Brandl
4,393,854 A    7/1983  Tacquet
(Continued)

FOREIGN PATENT DOCUMENTS

DE    10 2012 008941 A1    11/2013
EP         2916075 A1     9/2015
GB       1 388 118 A      3/1975

OTHER PUBLICATIONS

International Search Report and Written Opinion issued in connection with corresponding PCT Application No. PCT/EP2017/061085 dated Aug. 16, 2017.

*Primary Examiner* — Steven B McAllister
*Assistant Examiner* — Ko-Wei Lin
(74) *Attorney, Agent, or Firm* — Grogan, Tuccillo & Vanderleeden, LLP

(57) ABSTRACT

A system for regulating the viscosity of a fluid prior to atomization includes a temperature controller configured to adjust a temperature of a fluid flowing in a conduit prior to atomization of the fluid by an atomizer fluidly connected to the conduit and a sensor in communication with the temperature controller such that the sensor can provide an indicator to the temperature controller of a viscosity of the fluid flowing in the conduit prior to atomization. An adjustment to the temperature of the fluid by the temperature controller is based at least in part on the measured viscosity indicator of the fluid, a target atomization-viscosity of the fluid, and a coking temperature of the fluid.

18 Claims, 5 Drawing Sheets

Figure 1:
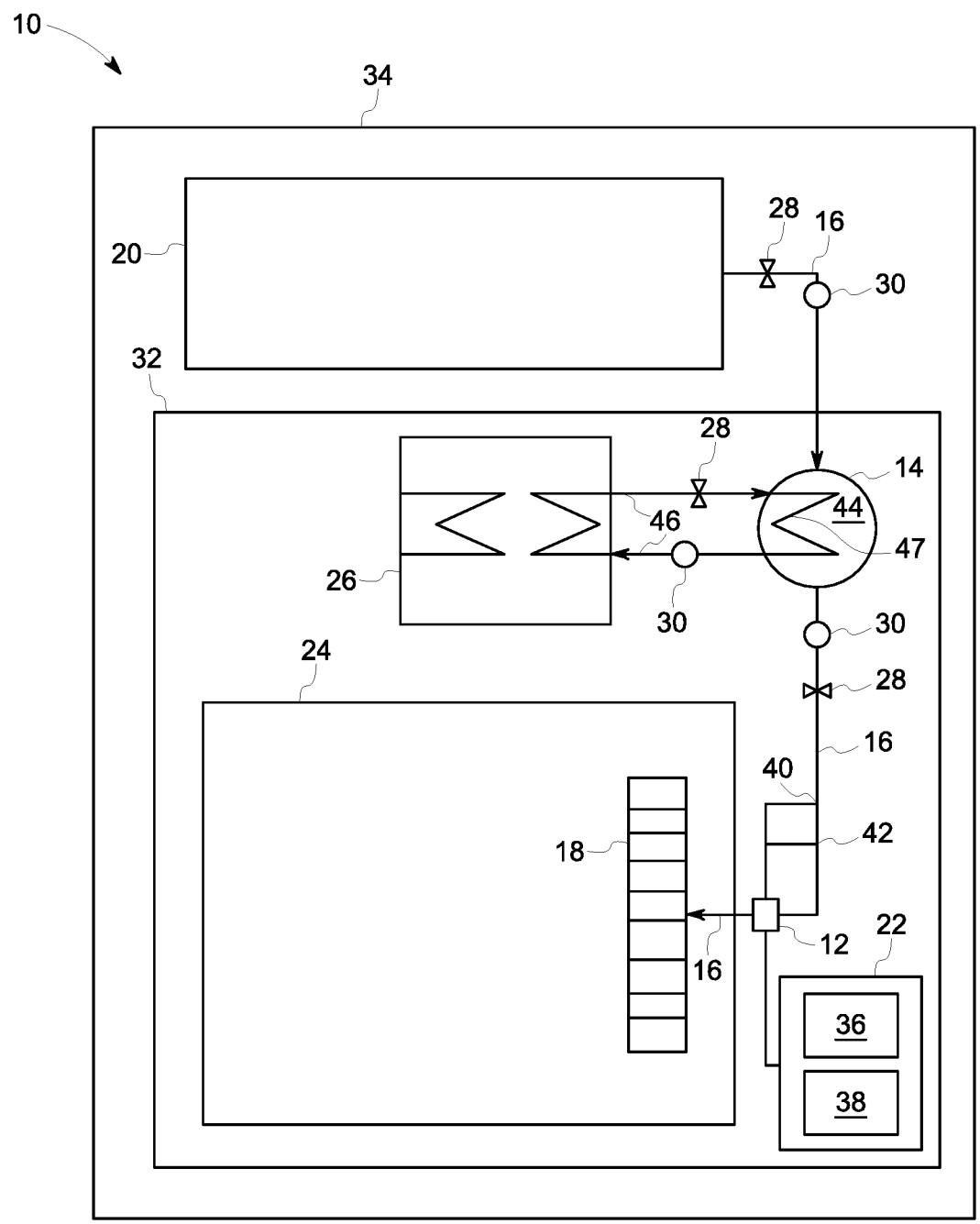

(51) Int. Cl.
*F02M 31/16* (2006.01)
*F02D 33/00* (2006.01)

(56) References Cited

U.S. PATENT DOCUMENTS

| | | | |
|---|---|---|---|
| 4,750,351 A * | 6/1988 | Ball | G01N 11/08 |
| | | | 73/54.04 |
| 5,096,566 A | 3/1992 | Dawson et al. | |
| 5,263,850 A | 11/1993 | Walker | |
| 2006/0207523 A1 * | 9/2006 | Patrick | F01K 3/24 |
| | | | 122/4 D |
| 2013/0255368 A1 * | 10/2013 | Harrison | E21B 49/081 |
| | | | 73/152.18 |

* cited by examiner

SYSTEM AND METHOD FOR REGULATING THE VISCOSITY OF A FLUID PRIOR TO ATOMIZATION

BACKGROUND

Technical Field

Embodiments of the invention relate generally to regulating the viscosity of a fluid and, more specifically, to a system and method for regulating the viscosity of a fluid prior to atomization.

Discussion of Art

Boilers are devices that combust a fuel, such as a petroleum based oil product, in a combustion chamber to generate heat. The ratio of heat generated by a boiler per a given amount of combusted fuel determines the boiler's efficiency. Many power plants use boilers to produce steam, which, in turn, is used to produce electricity via a steam turbine generator. Here, the power plant's efficiency is the ratio of electricity produced per a given amount of fuel. As will be appreciated, the more efficient the boiler of a power plant, the more steam produced per a given amount of fuel, and the more efficient the power plant.

One method of increasing the efficiency of a boiler is to improve combustion performance by atomizing a fuel, via an atomizer/spray nozzle(s), prior to firing the fuel in a combustion chamber. The ability of many atomizers to atomize a given fuel often depends on the viscosity of the fuel. In particular, for many atomizers, the lower the viscosity of a fuel, the better the atomizer is able to atomize it, i.e., the finer the mist produced by the atomizer. Typically, in the case of a boiler, the better an atomizer is able to atomize a fuel prior to combustion, the better the combustion performance of the boiler. Accordingly, many fuels have an optimal atomization viscosity for being atomized prior to combustion in a boiler.

The viscosity of many fuels decreases as temperature increases. Thus, many fuels have an optimal atomization temperature that corresponds to their optimal atomization viscosity. However, many fuels will form coke when heated to, or above, a "coking temperature." Coke formation can be problematic in the operation of a boiler as it tends to clog the atomizer and/or other components of the boiler—resulting in decreased efficiency. As a result, many traditional boilers are designed to combust fuels that have optimal atomization temperatures that are typically much lower than their coking temperatures.

Current boilers, however, are hindered in their ability to efficiently combust low-grade fuels, such as Oil Heavy Residue ("OHR"), as their coking temperatures are typically in close proximity to their optimal atomization temperatures. To address this issue, many current boilers decrease the viscosity of low-grade fuels by diluting them via kerosene and/or water. Diluting low-grade fuels, however, decreases the combustion performance of a boiler.

What is needed, therefore, is a system and method for regulating the viscosity of a fluid prior to atomization.

BRIEF DESCRIPTION

In an embodiment, a system for regulating the viscosity of a fluid prior to atomization includes a temperature controller configured to adjust a temperature of a fluid flowing in a conduit prior to atomization of the fluid by an atomizer fluidly connected to the conduit and a sensor in communication with the temperature controller such that the sensor can provide an indicator to the temperature controller of a viscosity of the fluid flowing in the conduit prior to atomization. An adjustment to the temperature of the fluid by the temperature controller is based at least in part on the measured viscosity indicator of the fluid, a target atomization-viscosity of the fluid, and a coking temperature of the fluid.

In another embodiment, a temperature controller for adjusting the temperature of a fluid prior to atomization is provided. The temperature controller includes a body configured to exchange heat between the fluid flowing in a conduit and a heat-transfer medium. The body has at least one heat-transfer surface having a design based at least in part on a difference between a target atomization-temperature of the fluid and a coking temperature of the fluid.

In yet another embodiment, a method for regulating the viscosity of a fluid prior to atomization includes providing to a temperature controller, via a sensor in communication with the temperature controller, an indicator of viscosity of the fluid flowing in a conduit prior to atomization of the fluid by an atomizer fluidly connected to the conduit and adjusting a temperature of the fluid prior to atomization, via the temperature controller. An adjustment to the temperature of the fluid by the temperature controller is based at least in part on the measured viscosity indicator of the fluid, a target atomization-viscosity of the fluid, and a coking temperature of the fluid.

DRAWINGS

The present invention will be better understood from reading the following description of non-limiting embodiments, with reference to the attached drawings, wherein below:

FIG. 1 is a block diagram of a system for regulating a viscosity of a fluid prior to atomization in accordance with an embodiment of the invention;

FIG. 2 is another block diagram of the system for regulating the viscosity of the fluid prior to atomization of FIG. 1 in accordance with an embodiment of the invention;

FIG. 3 is yet another block diagram of the system for regulating the viscosity of the fluid prior to atomization of FIG. 1 in accordance with an embodiment of the invention;

FIG. 4 is still yet another block diagram of the system for regulating a viscosity of a fluid prior to atomization of FIG. 1 in accordance with an embodiment of the invention;

FIG. 5 is a flow chart depicting a method for regulating the viscosity of a fluid prior to atomization via the system of FIG. 1 in accordance with an embodiment of the invention;

FIG. 6 is a graphical chart depicting regulation of the viscosity of the fluid over time by the system of FIG. 1 in accordance with an embodiment of the invention; and FIG. 7 is another graphical chart depicting the regulation of the viscosity of the fluid over time by the system of FIG. 1 in accordance with an embodiment of the invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a gas and/or plasma) may flow from one to the other. Accordingly, the terms "upstream" and "down stream," as used herein, describe the position of the referenced elements with respect to a flow path of a fluid flowing between and/or near the referenced elements.

The term "atomization," as used herein, means to reduce the referenced substance/object to a collection of fine parties and/or spray. It is to be understood, however, that such particles may be large enough to be visible by an unaided human eye. Further, as also used herein, the terms "atomization viscosity" and "atomization temperature" refer to the temperature and to the viscosity, respectively, of a fluid when it is atomized. Further still, the term "coking temperature," as used herein, means the temperature at which a fluid, typically a fuel, beings to coke.

Additionally, while the embodiments disclosed herein are described with respect to oil/gas-based boilers, it is to be understood that embodiments of the present invention are equally applicable to any device and/or process related to medicine, e.g., drug manufacturing, drug treatments, medical procedures; chemical production; manufacturing; combustion related processes other than boiler applications, e.g., fuel injection for internal combustion and/or jet engines, and/or any other process that requires atomization of a fluid and/or where a fluid is maintained at a viscosity having a temperature that is close in proximity to the fluid's coking temperature.

Referring to FIG. 1, a system 10 for regulating a viscosity of a fluid prior to atomization, in accordance with embodiments of the invention, includes a sensor 12, and a temperature controller 14. The sensor 12 measures a viscosity indicator of a fluid flowing in a conduit 16 prior to atomization of the fluid by an atomizer 18 that is fluidly connected to the conduit 16. As will be appreciated, the viscosity indicator, also referred to herein as "measured viscosity" and/or simply "viscosity", may be a direct viscosity measurement or an indirect measurement derived from measuring one or more physical properties of the fluid flowing in the conduit 16. The temperature controller 14 is in communication with the sensor 12 and adjusts a temperature of the fluid prior to atomization of the fluid by the atomizer 18. In embodiments, the system 10 may further include the conduit 16, the atomizer 18, a fuel tank/source 20, a process controller 22, a combustion chamber 24, a heating source 26, one or more valves 28, and/or one or more pumps 30. In embodiments, the system 10 may form part of a boiler 32 that may in turn form part of a power plant 34. In such embodiments, the fluid in the conduit 16 may be a low-grade petroleum based fuel such as OHR.

The tank/source 20 stores and/or supplies the fluid to the conduit 16. The conduit 16 is configured to transport, i.e., allow the fluid to flow, from the fuel tank/source 20 to the atomizer 18. The atomizer 18 is fluidly connected to the conduit 16 and atomizes the fluid. In embodiments, wherein the system 10 has a combustion chamber 24 and the fluid in the conduit 16 is a fuel, the atomizer 18 may atomize the fuel prior to combustion of the fuel in the combustion chamber 24. In such embodiments, the combustion chamber 24 combusts the atomized fuel to generate heat, which in turn may be used to generate steam, via the boiler 32, for electrical energy production in the power plant 34. The process controller 22 includes at least one processor/CPU 36, and at least one memory device 38 that may store a viscosity regulating application/program.

As can be seen in FIG. 1, the sensor 12 may be disposed within the system 10 such that the sensor 12 measures the viscosity of the fluid near the atomizer 18. Accordingly, the sensor 12 may be located at a point downstream of where the fuel is heated and, in some embodiments, immediately before the atomizer 18. For example, as shown in FIG. 1, the sensor 12 may measure the viscosity of the fluid in the conduit 16 at a point directly upstream of the atomizer 18. In embodiments, the sensor 12 may measure the viscosity of the fluid inside the atomizer 18 (prior to atomization of the fluid), and/or the sensor 12 may be incorporated into the atomizer 18 as a single unit. The sensor 12 may be configured to directly measure the viscosity of the fluid in the conduit 16. For example, in embodiments, the sensor 12 may be an on-line viscosity analyzer that measures the shear rate of the fluid. Alternatively, the sensor 12 may indirectly measure the viscosity of the fluid in the conduit 16 via an indication/indicator of the viscosity of the fluid from which the viscosity of the fluid may be calculated and/or estimated. For example, in such embodiments, the sensor 12 may measure the viscosity of the fluid by sensing/measuring a drop in pressure of the fluid across a first point 40 and a second point 42 of the conduit 16.

The temperature controller 14 may be disposed within the system 10 upstream of the atomizer 18 with respect to the conduit 16, and/or the temperature controller 14 may be integrated with the atomizer 18 and/or the sensor 12 to form a single unit. The temperature controller 14 may be configured to directly heat and/or cool the fluid in the conduit 16. For example, in embodiments, steam may be utilized to heat the fluid. Further, in embodiments, the temperature controller 14 may include a body 44 configured to indirectly exchange heat between the fluid in the conduit 16 and a heat-transfer/transferring medium flowing in a heat-transfer conduit 46. The body 44 may have at least one heat-transfer/transferring surface 47 that may form part of the conduit 16 and/or the heat-transfer conduit 46. For example, the temperature controller 14 may be a heat exchanger having two separate passages, wherein a first passage is fluidly connected to conduit 16 and a second passage is fluidly connected to the heat-transfer conduit 46. In such embodiments, the heat-transfer medium may be a fluid, gas, and/or plasma flowing in the second passage/heat-transfer conduit 46 such that thermal energy, i.e. heat, can transfer, via the heat-transferring surface 47, between the fluid flowing in the first passage/conduit 16 and the heat-transferring medium. The heat transfer medium may in turn be heated and/or cooled by the heating source 26. In embodiments, the heat-transferring medium may be selected for use in the system 10 based at least in part on the ability of the heat-transferring medium to maintain stability with respect to its heat transferring characteristics at temperatures below the coking temperature of the fluid in conduit 16. As will be appreciated, in order to supply heat into the fuel, the heating surface may be hotter than the fuel, and in particular, the heating surfaces may be controlled to a temperature approaching, but not exceeding, the coking temperature of the fuel so as to achieve the optimum or highest heating rate/highest heat flux, thereby resulting in the smallest size heater.

Figure 2:
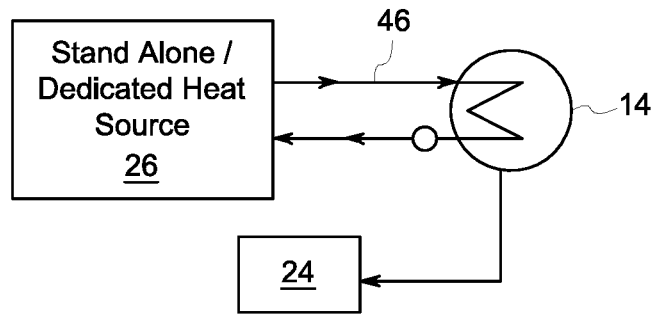
Figure 3:
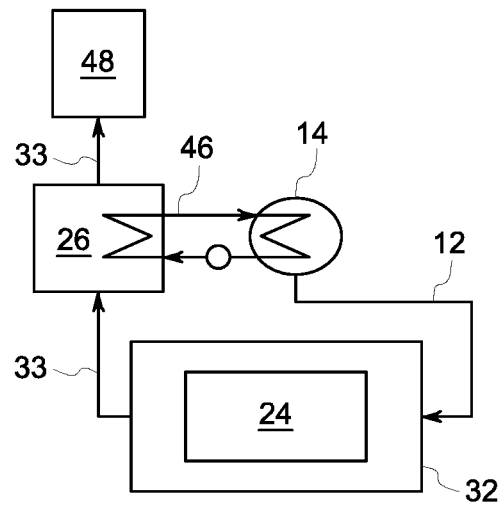
Figure 4:
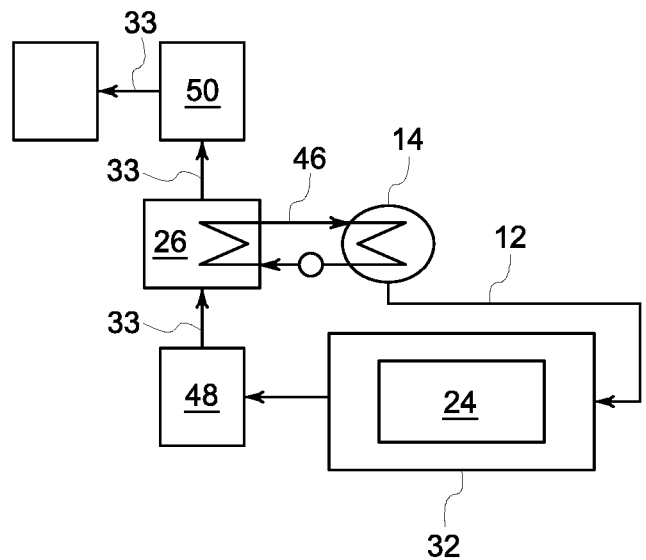

As can be seen in FIG. 2. The heating source 26 may be independent and/or isolated from heat produced by combusting the fuel in the combustion chamber 24, e.g., the heating source may be a stand alone boiler, electric resistance coil heater, and/or any heat source other than the combustion chamber 24. Alternatively, as illustrated in FIGS. 3 and 4, the heating source 26 may be steam and/or a flue gas produced by a boiler 32 and/or a combustion chamber 24. For example, in embodiments, the heat-transfer medium in conduit 46 may be heated by the flue gas from the combustion chamber 24 at a point in a flow path 33 of the flue gas between a gas-gas heater 48 and the combustion chamber 24, as shown in FIG. 3, and/or at a point in/of the flow path 33 of the flue gas down stream of the gas-gas heater 48, e.g., at a point between an economizer 50 and the gas-gas heater 48, as shown in FIG. 4. The gas-gas heater 48 may heat combustion air for air-fired applications or to heat recycled gas/oxidant for oxy-fired applications. It is to be understood that in other embodiments, the heat-transfer medium may be heated and/or partially heated by the flue gas at other points along the flow path 33 of the flue gas.

Figure 5:
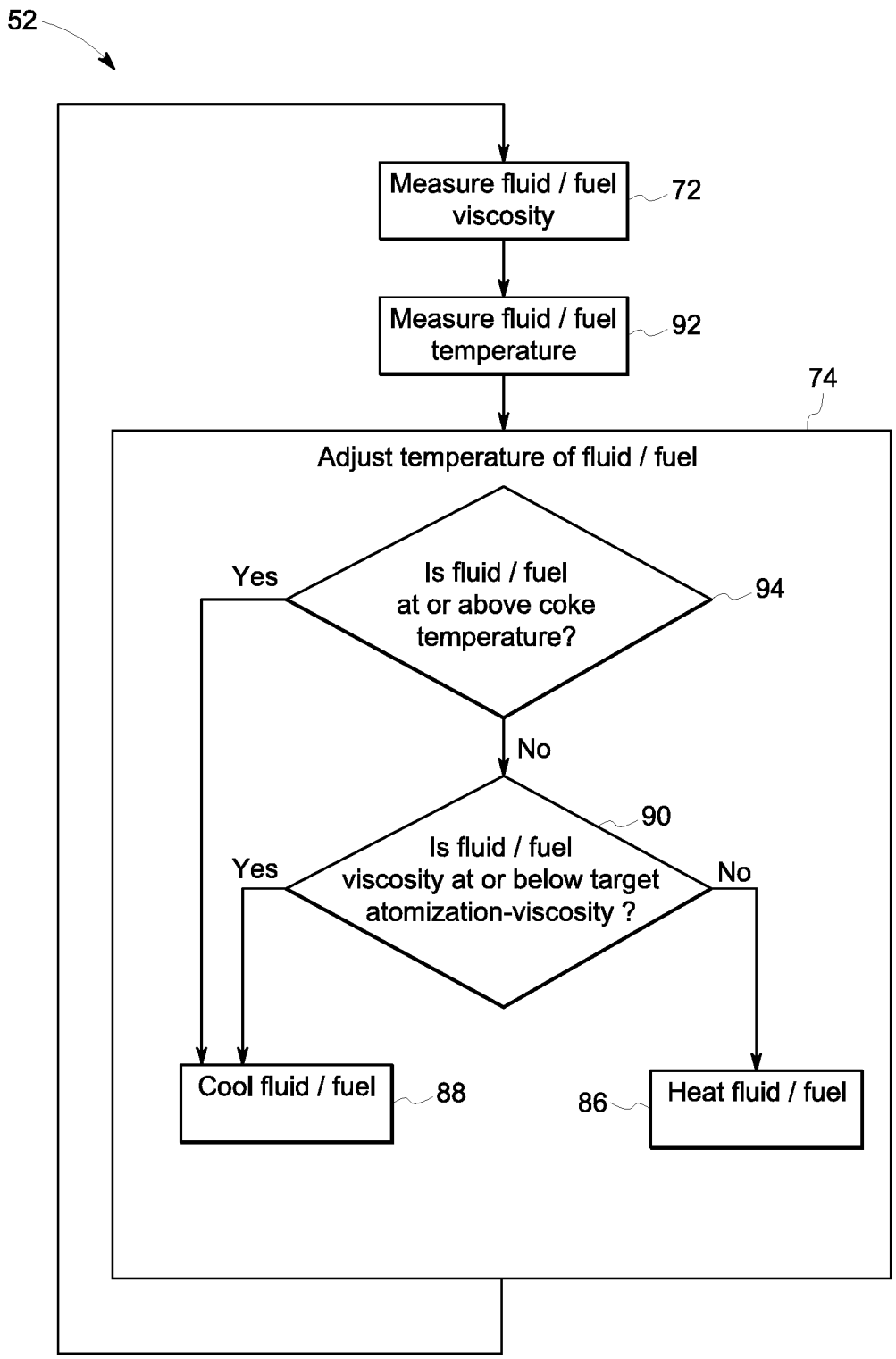
Figure 6:
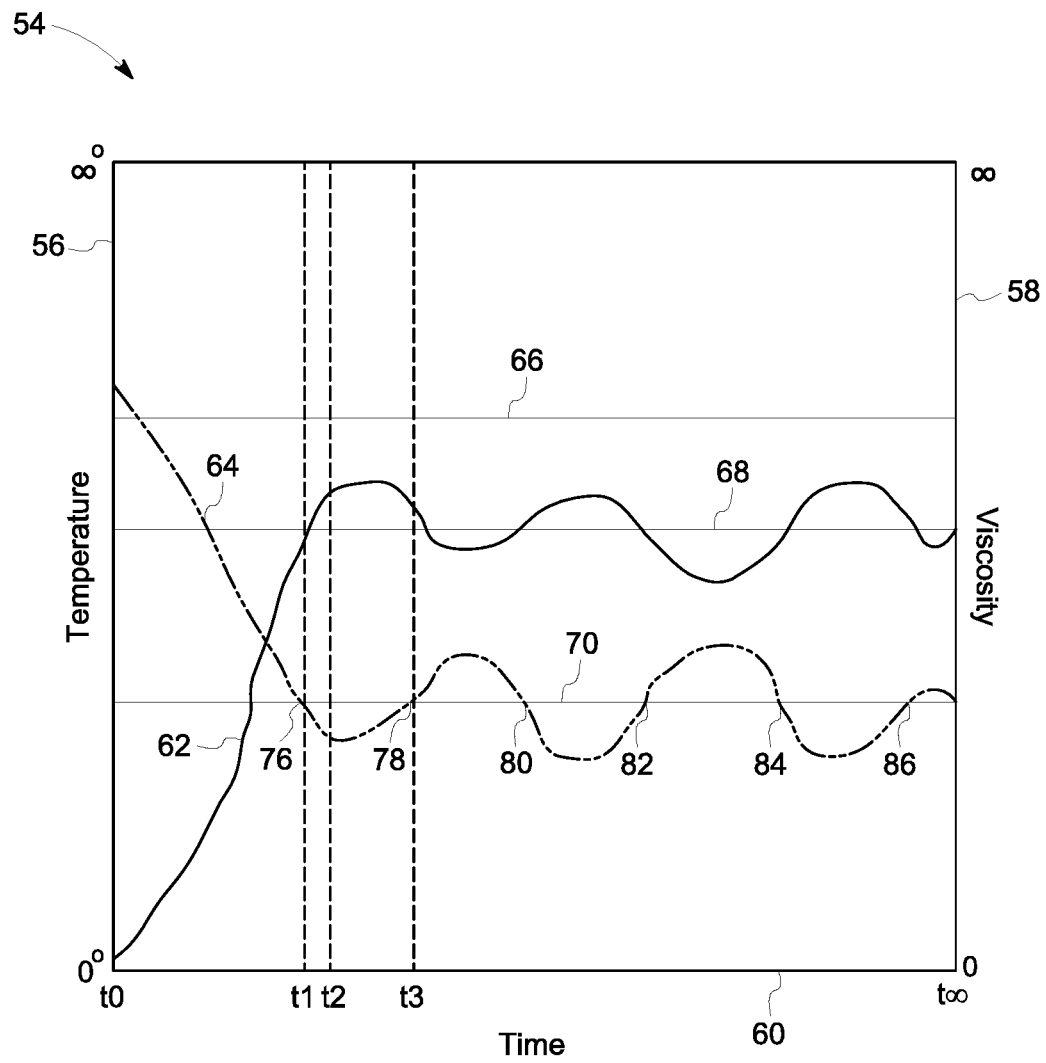

Referring now to FIGS. 5 and 6, a method 52 for regulating the viscosity of a fluid prior to atomization, and a graphical chart 54 depicting regulation of the viscosity of the fluid in conduit 16 over time by the system 10, in accordance with embodiments of the invention, are shown. In embodiments, the viscosity regulation application stored in the memory device 38 may be loaded into the at least one processors 36 to adapt the process controller 22 to perform method 52. In such embodiments, the process controller 22 may provide for real-time and/or near real-time regulation of the viscosity of the fluid prior to atomization.

As shown in FIG. 6, axes 56, 58 and 60 of graph 54 represent temperature, viscosity, and time, respectively. Further, curves 62 and 64 represent the temperature and the viscosity of the fluid in the conduit 16 over the time period $t_0$ to $t_\infty$. Lines 66, 68, and 70 represent the coking temperature, the target-atomization temperature, and the target-atomization viscosity of the fluid in the conduit 16, respectively. In embodiments, the target-atomization temperature 68 is the temperature of the fluid in the conduit 16 that corresponds to the target-atomization viscosity 70 of the fluid. In embodiments, the target-atomization viscosity 70 is a viscosity that the system 10 seeks to insure that the fluid in the conduit 16 has when it is atomized by the atomizer 18. In embodiments, the target-atomization viscosity 70 may be based at least in part on the characteristics/qualities of the fluid in conduit 16 and/or the characteristic/qualities of the atomizer 18. In embodiments, the target-atomization viscosity 70 may be the optimum viscosity of the fluid in the conduit 16 for atomization.

Accordingly, as shown in FIG. 5, the method 52 includes measuring 72 the viscosity of the fluid flowing in the conduit 16 prior to atomization and adjusting 74 the temperature of the fluid in the conduit 16 prior to atomization. Measuring 72 the viscosity of the fluid in the conduit 16 may be accomplished/performed by the sensor 12 in the manner described above.

Adjusting 74 the temperature of the fluid in the conduit 16 may be accomplished/performed by the temperature controller 14 which, as best seen in FIG. 6, advantageously attempts to maintain the temperature 62 of the fluid at and/or near the target-atomization temperature 68 so that the viscosity 64 of the fluid in the conduit 16 is at and/or near, e.g., within acceptable tolerances/deviations, the target-atomization viscosity 70 when the fluid is atomized. As such, temperature controller 14 may make one or more adjustments 76, 78, 80, 82, 84, 86 based at least in part on the viscosity 64 of the fluid, the target atomization-viscosity 70 of the fluid, and/or the coking temperature 66 of the fluid.

As further shown in FIG. 5, in embodiments, adjusting 74 the temperature of the fluid in the conduit 16 may include heating 86 and/or cooling 88 the fluid. Adjusting 74 the temperature of the fluid in the conduit 16 may further include determining 90 whether the viscosity 64 of the fluid is at or below the target-atomization viscosity 70 prior to heating 86 or cooling 88 the fluid. For example, in embodiments, the temperature of the fluid in the conduit 16 may only be heated 86 if the viscosity 64 is above the target-atomization viscosity 70.

The method 52 may further include measuring 92 the temperature 62 of the fluid in the conduit 16 prior to atomization. The temperature may be measured by a separate temperature sensor or by a temperature sensor that is integrated with the sensor 12. The temperature measurement 92 may be used to calculate/estimate how much the temperature 62 of the fluid in the conduit 16 must be adjusted, e.g., heated 86 or cooled 88, by the temperature controller 14 to keep the viscosity 64 at and/or near the target-atomization viscosity 70.

Additionally, adjusting 74 the temperature of the fluid in the conduit 16 may further include determining 94, based at least in part on the temperature 62 of the fluid in the conduit 16, if the temperature 62 of the fluid in the conduit 16 is at or above the coking temperature 66. In embodiments, if the temperature of the fluid in the conduit 16 is at or above the coking temperature 66, then the fluid is cooled 88.

For example, as shown in FIG. 6, at to, the viscosity 64 of the fluid, e.g., fuel, is above the target viscosity 70. Accordingly, the temperature controller 14 heats 86 the fuel in the conduit 16 until the viscosity 64 of the fuel is at and/or near the target viscosity 70 at h. As the temperature 62 of the fuel continues to rise, it is allowed to cool 88 at $t_2$ so that the temperature 62 of the fuel does not reach or exceed the coking temperature 66. As the fuel cools 88, the viscosity 64 increases, however, the fuel is heated 86 at $t_3$ before the viscosity 64 significantly increases. Thus, as can be seen, embodiments of the invention regulate the viscosity 64 of the fuel in the conduit 16 such that the viscosity 64 is kept at and/or near the target viscosity 70 without significant risk of the temperature 62 of the fuel reaching and/or exceeding the coking temperature 66.

It is to be understood that embodiments of the invention may include upper and/or lower thresholds for the viscosity and/or temperature of the fuel which, when exceeded, trigger the temperature controller 14 to either heat 86 and/or cool 88 the fluid/fuel in conduit 16. Such thresholds may be incorporated into a proportional integral ("PID") control algorithm to ensure smooth transitions between heating and cooling cycles.

Figure 7:
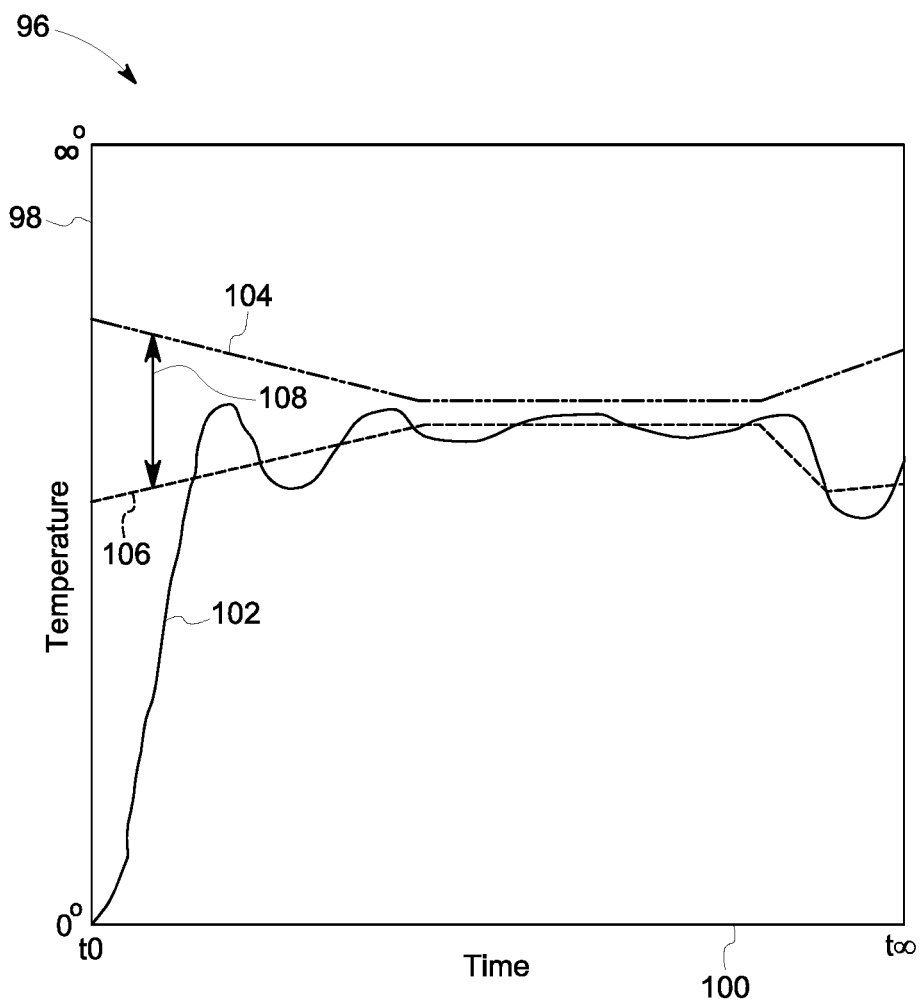

Turning now to FIG. 7, another graphical chart/graph 96 depicting the regulation of the viscosity of the fluid over time by the system 10 in accordance with embodiments of the invention is shown. Axes 98 and 100 of the chart/graph 96 represent temperature and time, respectively. Curve 102 represents the temperature of the fuel in the conduit 16 over the time period $t_0$ to $t_\infty$. Lines 104 and 106 represent the coking temperature and the target-atomization temperature of the fuel in the conduit 16, respectively. As shown by graph 96, due to variations in the characteristic of the fuel over time, the coking temperature 104 and/or the target-atomization temperature 106 (resulting from changes in the target and/or optimal viscosity of the fluid) may change over time in relation to one another.

Accordingly, the temperature controller 14 may have a heat flux rate (best seen as the magnitude of the slope of the temperature curve 102 in FIG. 7) that is based at least in part on a difference 108 between the target atomization-temperature 106 and the coking temperature 104 of the fuel in the conduit 16. The heat flux rate of the temperature controller 14 is the rate at which the temperature controller 14 adds and/or removes heat from the fuel in the conduit 16. In embodiments, the at least one heat-transferring surface 47 of the body 44 may have a design based at least in part on the difference 108 between the target atomization-temperature 106 and the coking temperature 104 of the fuel in the conduit 16. The heat flux rate may be based at least in part on the design of the heat-transferring surface 47.

For example, in embodiments, the flux rate of the temperature controller 14 may decrease and increase as the difference 108 between the coking temperature 104 and the target-atomization temperature 102 increases and decreases. In particular, as can be seen in FIG. 7, as the difference 108 decreases, so may the magnitude of the slope of curve 102, i.e., curve 102 gets smoother as the difference 108 gets smaller. Thus, by reducing the flux rate as the difference 108 gets smaller, the temperature controller 14 reduces the risk that the fuel will exceed the coking temperature 104.

Additionally, in embodiments, some and/or all of the conduit 16 and/or other parts of the system 10 may be insulated to reduce heat loss. For example, the conduit 16 and/or other parts of the system 10 may be insulated via heat tracing, e.g., electrical heating and/or electrical heat tape, steam, and/or other hot gases/fluids. In embodiments, the conduit 16 may be insulated so that it is approximately the same temperature as the target-atomization temperature of the fluid. For example, the conduit 16 and/or other parts of the system 10 may be insulated by the heat-transfer medium flowing in the heat transferring conduit 46. In such embodiments, the conduit 16 and/or other parts of the system 10 may have jacketed piping through which the heat-transfer medium flows.

Further, not all embodiments of the application require the fuel to be atomized, i.e., the system 10 may be used to regulate the viscosity of a fluid; e.g., fuel, being delivered/transported over long distances by a pipeline. For example, in such embodiments, the temperature controller 14 may be configured to keep the viscosity of the fluid in the conduit 16 at and/or near a target viscosity, the target viscosity being a viscosity of the fluid for a purpose other than atomization, while simultaneously reducing the risk that the temperature of the fluid will reach and/or exceed the coking temperature.

It is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the system 10 may include at least one processor 36, system memory 38 including random access memory (RAM) and read-only memory (ROM), an input/output controller, and one or more data storage structures. All of these latter elements may be in communication with the at least one processor 36 to facilitate the operation of the system 10 as discussed above. Suitable computer program code may be provided for executing numerous functions, including those discussed above in connection with the system 10 and method 52 disclosed herein. The computer program code may also include program elements such as an operating system, a database management system and "device drivers" that allow the system 10, to interface with computer peripheral devices, e.g., sensors, a video display, a keyboard, a computer mouse, etc.

The at least one processor 36 of the system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 and/or one or more programs, e.g., computer program code and/or a computer program product, adapted to direct the system 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 36 of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for regulating the viscosity of a fluid prior to atomization includes a temperature controller configured to adjust a temperature of a fluid flowing in a conduit prior to atomization of the fluid by an atomizer fluidly connected to the conduit and a sensor in communication with the temperature controller such that the sensor can provide an indicator to the temperature controller of a viscosity of the fluid flowing in a conduit prior to atomization of the fluid. An adjustment to the temperature of the fluid by the temperature controller is based at least in part on the measured viscosity indicator of the fluid, a target atomization-viscosity of the fluid, and a coking temperature of the fluid. In certain embodiments, the temperature controller adjusts the temperature of the fluid indirectly via a heat-transfer medium. In certain embodiments, the heat-transfer medium is heated via a flue gas from a combustion chamber. In certain embodiments, the flue gas heats the heat-transfer medium at a point in a flow path of the flue gas down stream of a gas-gas heater. In certain embodiments, the flue gas heats the heat-transfer medium at a point in a flow path of the flue gas between an economizer and a gas-gas heater. In certain embodiments, the sensor measures the viscosity indicator of the fluid near the atomizer. In certain embodiments, the temperature controller has a heat flux rate that is based at least in part on a difference between the target atomization-temperature of the fluid and the coking temperature of the fluid. In certain embodiments, the temperature controller includes at least one heat-transfer surface that has a design based at least in part a difference between the target atomization-temperature of the fluid and the coking temperature of the fluid. In certain embodiments, the sensor is an on-line viscosity analyzer. In certain embodiments, the viscosity indicator is a drop in pressure of the fluid between a first point and a second point of the conduit. In certain embodiments, the fluid is an oil heavy residue fuel that is supplied to a combustion chamber after atomization.

Other embodiments provide for a temperature controller for adjusting the temperature of a fluid prior to atomization. The temperature controller includes a body configured to exchange heat between the fluid flowing in a conduit and a heat-transfer medium. The body has at least one heat-transfer surface having a design based at least in part on a difference between a target atomization-temperature of the fluid and a coking temperature of the fluid. In certain embodiments, the temperature controller has a heat flux rate that is based at least in part on the difference between the target atomization-temperature of the fluid and the coking temperature of the fluid. In certain embodiments, the temperature controller is configured to adjust the temperature of the fluid based at least in part on a viscosity indicator of the fluid obtained by a sensor. In certain embodiments, the fluid is an oil heavy residue fuel that is supplied to a combustion chamber after atomization.

Yet still other embodiments a method for regulating the viscosity of a fluid prior to atomization includes providing to a temperature controller, via a sensor in communication with the temperature controller, an indicator of viscosity of the fluid flowing in a conduit prior to atomization of the fluid by an atomizer fluidly connected to the conduit and adjusting a temperature of the fluid prior to atomization, via the temperature controller. An adjustment by the temperature controller to the temperature of the fluid is based at least in part on the measured viscosity indicator of the fluid, a target atomization-viscosity of the fluid, and a coking temperature of the fluid. In certain embodiments, adjusting, via the temperature controller in communication with the sensor, the temperature of the fluid prior to atomization includes heating the fluid indirectly via a heat-transfer medium. In certain embodiments, the heat-transfer medium is heated via a flue gas from a combustion chamber. In certain embodiments, the temperature controller has a temperature gradient/heat flux rate that is based at least in part on a difference between the target atomization-temperature of the fluid and the coking temperature of the fluid. In certain embodiments, the fluid is an oil heavy residue fuel that is supplied to a combustion chamber after atomization.

Accordingly, embodiments of the present invention provide many benefits over traditional fluid/fuel heating systems. For example, some embodiments, where the fluid is a fuel being combusted in a power plant boiler, regulation of the viscosity of the fuel by the temperature controller 14, and in particular in such embodiments where the temperature controller regulates at real-time or near-real time, increase the likelihood that the fuel will be at the target viscosity when atomized while simultaneously decreasing the risk that the temperature of the fuel will reach and/or exceed the coking temperature. Moreover, some embodiments of the invention, that provide for real-time and/or near-real time regulation of the viscosity of the fluid in the conduit 16, may further maximize the temperature and/or viscosity of the fluid while minimizing the risk of the fluid coking. Thus, some embodiments provide for boilers that more efficiently combust low grade fuels, such as OHR, which tend to be nearly solid at room temperatures. Further, using the flue gas and/or steam produced by a boiler that powers an electrical generator, as done by some embodiments, also increases the overall efficiency of the boiler and/or associated power plant.

Additionally, embodiments may facilitate the atomization of very high viscosity fuels, e.g., vacuum bottom/heavy oil residues which are essentially solid at room temperature, by heating such fuels to a temperature very near the temperature that long chain hydrocarbon compounds within such fuels breakdown and coke. As will be appreciated, the difference in temperatures needed for good atomization and the fuel coking temperature of such fuels is typically only a few hundred degrees. For example, in embodiments, the difference may be about 10° F. As such, embodiments of the system and methods disclosed herein heat such high viscosity fuels while minimizing coking via controlling peak temperatures of heating surfaces in contact with the fuel. Further, by utilizing indirect heating, via a heat transfer medium, some embodiments provide for more precise control and a means of limiting the temperature of surfaces in contract with the fuel.

Further, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for regulating the viscosity of a fluid prior to atomization, the system comprising:
    a temperature controller having a processor and a body including a heat transfer surface, the processor configured to adapt the temperature controller to adjust a temperature of a fluid flowing in a conduit prior to atomization of the fluid by an atomizer fluidly connected to the conduit;
    a sensor in communication with the processor such that the sensor provides an indicator to the processor of a viscosity of the fluid flowing in the conduit prior to atomization;
    wherein an adjustment to the temperature of the fluid by the temperature controller via the processor is based on:
    the measured viscosity indicator of the fluid; and
    a heat flux rate of the temperature controller configured to respectively increase and decrease as the difference between a coking temperature of the fluid and a target-atomization temperature of the fluid increases and decreases.

2. The system of claim 1, wherein the temperature controller adjusts the temperature of the fluid indirectly via a heat-transfer medium.

3. The system of claim 2, wherein the heat-transfer medium is heated via a flue gas from a combustion chamber.

4. The system of claim 3, wherein the flue gas heats the heat-transfer medium at a point in a flow path of the flue gas downstream of a heater.

5. The system of claim 3, wherein the flue gas heats the heat-transfer medium at a point in a flow path of the flue gas between an economizer and a heater.

6. The system of claim 4, wherein the sensor measures the viscosity indicator of the fluid near the atomizer.

7. The system of claim 6, wherein the heat flux rate is dependent on the heat-transfer surface.

8. The system of claim 1, wherein the sensor is an on-line viscosity analyzer.

9. The system of claim 1, wherein the viscosity indicator is a drop in pressure of the fluid between a first point and a second point of the conduit.

10. The system of claim 7, wherein the fluid is an oil heavy residue fuel that is supplied to a combustion chamber after atomization.

11. A temperature controller for adjusting the temperature of a fluid prior to atomization, the temperature controller comprising:
    a body having a heat-transfer surface configured to exchange heat between the fluid flowing in a conduit and a heat-transfer medium; and
    a processor configured to adapt the temperature controller to adjust the temperature of the fluid in the conduit based on a heat flux rate of the temperature controller that respectively increases and decreases as a difference between a target atomization-temperature of the fluid and a coking temperature of the fluid increases and decreases.

12. The temperature controller of claim 11,
    wherein the temperature controller further comprises a sensor, and
    wherein the temperature controller via the processor adjusts the temperature of the fluid based on a viscosity indicator of the fluid obtained by the sensor.

13. The temperature controller of claim 11, wherein the fluid is an oil heavy residue fuel that is supplied to a combustion chamber after atomization.

14. A method for regulating the viscosity of a fluid prior to atomization, the method comprising:
providing to a processor of a temperature controller, via a sensor in communication with the processor, an indicator of viscosity of the fluid flowing in a conduit prior to atomization of the fluid by an atomizer fluidly connected to the conduit;
adjusting, via the processor adapting the temperature controller, a temperature of the fluid prior to atomization based on:
the measured viscosity indicator of the fluid; and
a heat flux rate of the temperature controller configured to respectively increase and decrease as a difference between a target atomization-temperature of the fluid and a coking temperature of the fluid increases and decreases.

15. The method of claim 14, wherein adjusting, via a processor adapting the temperature controller, the temperature of the fluid prior to atomization comprises:
heating the fluid indirectly via a heat-transfer medium.

16. The method of claim 15, wherein the heat-transfer medium is heated via a flue gas from a combustion chamber.

17. The method of claim 14, wherein the fluid is an oil heavy residue fuel that is supplied to a combustion chamber after atomization.

18. A system for regulating the viscosity of a fluid prior to atomization, the system comprising:
a processor;
a temperature controller including a heat transfer surface and in electronic communication with the processor;
a sensor in electronic communication with the processor such that the sensor provides an indicator to the processor of a viscosity of the fluid flowing in the conduit prior to atomization;
wherein the processor is configured to adjust the temperature of the fluid via the temperature controller based on:
the measured viscosity indicator of the fluid; and
a heat flux rate of the temperature controller configured to respectively increase and decrease as the difference between a coking temperature of the fluid and a target-atomization temperature of the fluid increases and decreases.

* * * * *